United States Patent [19]

Johnston et al.

[11] 4,033,758
[45] July 5, 1977

[54] PROCESS FOR PRODUCING MAGNESIUM UTILIZING ALUMINUM-SILICON ALLOY REDUCTANT

[75] Inventors: James D. Johnston; Robert N. Sanders; James M. Wood, Jr., all of Baton Rouge, La.

[73] Assignee: Ethyl Corporation, Richmond, Va.

[22] Filed: Sept. 4, 1975

[21] Appl. No.: 610,464

[52] U.S. Cl. .................................. 75/67 R
[51] Int. Cl.$^2$ .................................. C22B 45/00
[58] Field of Search .................................. 75/67 R

[56] References Cited

UNITED STATES PATENTS

| 3,520,524 | 7/1970 | Stawarz et al. | 75/67 R UX |
| 3,567,431 | 3/1971 | Schmidt | 75/67 R |
| 3,681,053 | 8/1972 | Avery | 75/10 R |

Primary Examiner—M. J. Andrews
Attorney, Agent, or Firm—Donald L. Johnson; John F. Sieberth; Paul H. Leonard

[57] ABSTRACT

Magnesium metal is produced by the reaction of aluminum-silicon alloy with a calcium magnesium aluminate silicate slag or with magnesium oxide in the presence of such slag, at a temperature of about 1,400°–1650° C and a pressure of 25–500 millimeters of mercury.

16 Claims, No Drawings

PROCESS FOR PRODUCING MAGNESIUM UTILIZING ALUMINUM-SILICON ALLOY REDUCTANT

BACKGROUND OF THE INVENTION

The present invention relates to the production of magnesium metal by the reduction of magnesium oxide at elevated temperatures in the presence of an aluminum-silicon alloy reducing agent and a molten oxidic slag in an electric furnace, and the condensation of vaporized magnesium in a condenser.

An advantageous method of producing magnesium lies in the chemical reduction of magnesium oxide with a reducing agent in the presence of a molten oxide slag in an electric furnace. A variety of metallothermic processes, as they are commonly called, for the production of magnesium employing various reducing agents, various types of reactants, and under various conditions of temperatures and pressures have been proposed.

In general, the various metallothermic processes are concerned with the production of metallic magnesium by the reduction of magnesium oxide with a metal reductant at elevated temperatures. Magnesium oxide, usually in the form of calcined dolmite (dolime) or calcined magnesite or mixtures thereof, is caused to react with a metallic reducing agent, such as silicon, aluminum, calcium or mixtures or alloys thereof, in the presence of a molten slag bath in a furnace at temperatures in excess of 1300° C, to release magnesium vapor which may be condensed and collected. Some of the processes are carried out in the presence of an inert gas.

An early process of this type, called the Pidgeon process provides for the production of magnesium by the reduction of magnesium oxide with ferrosilicon.

A more recent process is exemplified by U.S. Pat. No. 2,971,833 and is known as the Magnetherm process. The process is operated under a very high vacuum (pressure ranging between 5 and 20 millimeters of mercury) and at a temperature of about 1500° C utilizing an electric furnace. Silicon is employed as the reductant, preferably in the form of ferrosilicon containing 70 – 80 percent Si, silicon of a purity in excess of 97 percent, or an aluminum-ferrosilicon. Care is taken to avoid that the silicon content of the residual ferrosilicon drops below 33.5 percent. A magnesia-containing substance is dissolved in a liquid slag consisting essentially of lime, silica and alumina wherein the ratio of calcium oxide to silicon dioxide and the ratio of aluminum oxide to silicon dioxide are controlled.

Processes employing aluminum-silicon alloy as the reductant are exemplified by U.S. Pat. Nos. 3,427,152, 3,441,402, 3,579,326, 3,698,888, 3,761,247, 3,761,248. In the first patent, magnesium is produced by thermal treatment of a mixture of magnesium oxide and a reducing agent wherein the necessary heat is imparted by pre-heated inert gas which is counter-currently flowed with respect to the magnesium oxide. The second patent relates to a process for the continuous production of magnesium metal which comprises introducing a mixture of magnesium ores into a submerged arc electric furnace together with a reducing agent. Furnace temperature is maintained below about 1500° C and operated at one atmosphere. The third patent provides for a process for producing magnesium by reducing magnesium oxide from an oxidant containing a major proportion of magnesia with a metallic aluminum-silicon alloy reductant having a ratio of silicon to aluminum of at least 0.8 to 1.0 at a temperature of at least 1400° C and in the presence of a molten slag comprising 5 – 25 percent magnesium oxide and less than 30 percent calcium oxide. The fourth patent relates to the production of magnesium by the metallothermic reduction of magnesium oxide in a reaction zone, by means of a metallic reducing agent, and in a reaction-condensation system containing in its vapor space an inert gas at a partial pressure of 0.25 – 2 atmospheres. The latter two patents relate to similar processes, but in one the reaction is carried out in the presence of hydrogen at a pressure of at least about one atmosphere and in the other, the production of magnesium is induced in part by the passage of inert gas through the reaction-condensation zone.

Other metallothermic processes for producing magnesia disclosing an aluminum-silicon alloy as a reductant, as well as other reductants, are disclosed in U.S. Pat. Nos. 1,311,378, 2,099,151, 2,126,825, 2,351,488, 2,351,489, 2,527,722 and 2,527,724.

U.S. Pat. No. 3,658,509 also discloses the use of aluminum-silicon alloy as the reductant as well as aluminum and silicon. In such process, an inert gas is used to obviate at least in part the need of a high vacuum. U.S. Pat. No. 3,681,053 also discloses the use of an aluminum-silicon alloy as the reductant for the production of magnesium from magnesium oxide at elevated temperatures in the presence of molten oxidic slag, but requires that the alloy contain at least 80 percent silicon and no more than 20 percent aluminum and minor amounts of iron or other non-reactive components.

U.S. Pat. Nos. 3,475,162 and 3,567,431 disclose metallothermic processes for producing magnesium, wherein the reducing agent is an aluminum-silicon-iron alloy and an aluminum-silicon-iron-titanium alloy, respectively.

The primary object of this invention is to provide a process for production of magnesium metal wherein aluminum-silicon alloy is reacted with a calcium magnesium aluminum silicate slag, or with magnesium oxide in the presence of said slag, which eliminates the disadvantages of the prior art processes, while retaining the benefits thereof.

Another object of this invention is to provide a process for production of magnesium metal at elevated temperatures and reduced pressures by reaction of an aluminum-silicon alloy with a calcium magnesium aluminum silicate slag, or with a magnesium oxide in the presence of said slag.

An important object of the present invention is to provide a process of the foregoing type which is economical.

Other objects and advantages of the present invention will become more readily apparent from a consideration of the description hereinafter.

SUMMARY OF THE INVENTION

The instant invention relates to a process for the production of magnesium metal by reaction of magnesium oxide either in the presence of a calcium magnesium aluminum silicate slag, or dissolved in said slag, with an aluminum-silicon alloy at a temperature of about 1400°–1650° C and a pressure of about 25 – 500 millimeters of mercury. Magnesium evolves as a vapor and is condensed and collected in suitable apparatus. Specific alloy and slag compositions are disclosed.

DESCRIPTION OF THE PREFERRED EMBODIMENT

In the process of the present invention, aluminum-silicon alloy is reacted with a calcium magnesium aluminum silicate slag or with magnesium oxide in the presence of said slag, to produce magnesium metal. Magnesium metal vapor is produced and condensed to a liquid or solid in a suitable condenser. Magnesium metal vapor is produced by the following one or two step reactions:

1. $3 MgO + 2 Al \rightarrow 3 Mg \uparrow + Al_2O_3$
2. $2 MgO + Si \rightarrow 2 Mg \uparrow + SiO_2$
3. (a) $3 SiO_2 + 4 Al \rightarrow 2 Al_2O_3 + 3 Si$
   (b) $6 MgO + 3 Si \rightarrow 6 Mg \uparrow + 3 SiO_2$ The reduction reaction is carried out in an internally heated electric furnace at a temperature of about 1400°–1650° C, preferably 1475°–1550° C, and a pressure of 25 – 500 millimeters of mercury, preferably 50 – 200 millimeters of mercury.

Aluminum-silicon alloy used in the process should comprise the following ingredients:

Al—15 – 75 wt %
Si—20 – 80 wt %
Total of Fe, Ti, C, O—0 – 10 wt %
$CO_2$—< 0.5 wt %
$H_2O$—< 0.5 wt %.

The magnesium oxide reactant may be MgO, dolime (CaO · x MgO, where $0.5 \leq X \leq 2.0$), magnesium silicate, or other minerals containing CaO, MgO, $Al_2O_3$ and/or $SiO_2$. It is essential however that these reactants contain less than 0.5 weight percent $CO_2$ and/or equivalent carbonate and less than 0.5 weight percent $H_2O$ and preferably less than one weight percent $Fe_2O_3$. The magnesium oxide added to the reactor should amount to at least 101 percent of the amount theoretically required to react with the aluminum-silicon alloy added. Other oxides required to maintain the desired slag composition are CaO, $Al_2O_3$, and/or $SiO_2$. These oxides should contain less than 0.5 weight percent $CO_2$ and/or equivalent carbonate, less than 0.5 weight percent $H_2O$, and preferably less than 1.0 weight percent iron oxides. The various reactants and other oxides may be added to the reactor separately or in combination.

The slag composition should be maintained in the following ranges:

CaO—42 – 65 wt %
MgO—1 – 11 wt %, preferably 1 – 5 wt %
$Al_2O_3$—11 – 38 wt %
$SiO_2$—5 – 19 wt %.

Slags in the foregoing ranges are advantageous in that they have satisfactory low melting points and viscosities. During a prolonged period of operation, it is preferable to maintain a fixed slag composition and to add reactants and other oxides in such proportions as will maintain said fixed slag composition.

The examples described in the following table illustrate the process. They are carried out in a reactor maintained at a temperature of 1500–1550° C and a pressure of about 50 mm mercury.

An initial quantity of molten slag is provided in the reactor, and it should have the same composition as the slag produced in the sample under study.

Reactants and oxides are added to the reactor in the amounts shown in the table. Magnesium metal vapor is evolved, and flows from the reactor to a condensor, where it is condensed to a liquid or solid. Slag produced by the reaction remains in the reactor, and is removed from time to time.

The reactants and added oxides may contain pure oxides, such as CaO, MgO, $Al_2O_3$, and $SiO_2$, but may also contain compounds of these oxides, such as dolime, magnesium silicate, calcium aluminate, etc.

| Reaction | Reactants and Added Oxides, Moles | | | | | | Moles Mg Vapor Produced | Slag Composition, wt % | | | | Lb Slag/ Lb Mg Produced |
|---|---|---|---|---|---|---|---|---|---|---|---|---|
| | CaO | MgO | Al | Si | $Al_2O_3$ | $SiO_2$ | | CaO | MgO | $Al_2O_3$ | $SiO_2$ | |
| 1 | 5.5 | 5.5 | 2 | 1 | | | 5 | 62.8 | 4.1 | 20.8 | 12.2 | 4.1 |
| 2 | 5.25 | 5.25 | 2 | 1 | 0.88 | | 5 | 52.9 | 1.8 | 34.5 | 10.8 | 4.6 |
| 3 | 8.0 | 7.7 | 2 | 2 | | | 7 | 64.1 | 4.0 | 14.6 | 17.2 | 4.1 |
| 4 | 6 | 8 | 3 | 1 | | 1.0 | 6.5 | 50.2 | 9.0 | 22.9 | 17.9 | 4.3 |

The foregoing disclosure and description of the invention is illustrative and explanatory thereof and various changes may be made within the scope of the appended claims without departing from the spirit of the invention.

What is claimed is:

1. A process for the production of magnesium in a reaction-condensation system having a reducing furnace zone and a condensation zone, comprising; reacting an aluminum-silicon alloy comprising by weight percent 15 – 75 aluminum and 20 – 80 silicon with a calcium magnesium aluminum silicate slag or magnesium oxide in the presence of said slag in the reducing furnace zone or reaction zone at a temperature of about 1400° – 1650° C and a pressure of about 25 – 500 millimeters of mercury, the amount of magnesium oxide fed into the reaction zone being at least 101 percent of the amount theoretically required to react with the aluminum-silicon alloy fed into the reaction zone, maintaining the composition of the slag in amounts by weight percent of 42 – 65 calcium oxide, 1 – 11 magnesium oxide, 11 – 38 aluminum oxide and 5 – 19 silicon dioxide, evolving magnesium vapor from the reducing furnace zone or reaction zone to the condensation zone, and condensing and recovering the magnesium as a product.

2. The process of claim 1, wherein said temperature is about 1475°–1550° C.

3. The process of claim 1, wherein said temperature is about 1500° C.

4. The process of claim 1, wherein said pressure is about 50 – 200 millimeters of mercury.

5. The process of claim 1, wherein the magnesium oxide is in the form of calcined dolime of the formula CaO · x MgO where $0.5 \leq X \leq 2.0$.

6. The process of claim 1, wherein an inert gas is employed to prevent air from contacting the magnesium.

7. The process of claim 1, wherein said aluminum-silicon alloy comprises by weight percent the following ingredients:

Aluminum (Al)—15 – 75
Silicon (Si)—20 – 80
Iron (Fe), Titanium (Ti), Carbon (C) and Oxygen (O) in Total—0 – 10
Carbon dioxide ($CO_2$)—< 0.5
Water ($H_2O$)—< 0.5.

8. The process of claim 1, wherein sufficient magnesium oxide is employed to provide that slag in the reaction zone contains 1 – 5 weight percent magnesium oxide.

9. In a process for producing magnesium by reduction of magnesium oxide with aluminum-silicon alloy in a reaction-condensation system and utilizing a molten oxidic slag, the improvement therein, wherein said aluminum-silicon alloy comprises by weight percent 15 – 75 aluminum and 20 – 80 silicon, said magnesium oxide is fed into the reaction zone in an amount of at least 101 percent of the amount theoretically required to react with said aluminum-silicon alloy fed into the reaction zone and said slag comprises by weight percent the following ingredients:

Calcium oxide (CaO)—42 – 65
Magnesium oxide (MgO)—1 – 11
Aluminum oxide ($Al_2O_3$)—11 – 38
Silicon dioxide ($SiO_2$)—5 – 19.

10. The process of claim 9, wherein said magnesium oxide is present in said slag in an amount of about 1 – 5 weight percent.

11. A process for the production of magnesium metal in a reaction-condensation system having a reducing furnace zone and a condensation zone, comprising preparing and melting in the reaction zone a magnesium oxide slag of the following weight percent composition:

Calcium oxide (CaO)—42 – 65
Aluminum oxide ($Al_2O_3$)—11 – 38
Magnesium oxide (MgO)—1 – 11
Silicon dioxide ($SiO_2$)—5 – 19 reacting with the molten oxidic slag in the reaction zone an aluminum-silicon alloy of the following weight percent composition:

Aluminum (Al)—15 – 75
Silicon (Si)—20 – 80
Iron (Fe), Titanium (Ti), Carbon (C) and Oxygen (O) in Total—0 – 10
Carbon dioxide ($CO_2$)—< 0.5
Water ($H_2O$)—< 0.5 carrying out the reaction at a temperature of about 1400° – 1650° C and at a pressure of about 25 – 500 millimeters of mercury, adding magnesium oxide in the reaction zone as the reaction continues so that the amount thereof is at least 101 percent of the amount theoretically required to react with the aluminum-silicon alloy, periodically withdrawing molten oxidic slag from the reaction zone, maintaining the composition of the molten oxidic slag in the reaction zone in the amounts aforesaid, evolving magnesium vapor from the reaction zone to the condensation zone and recovering magnesium metal as a product.

12. The process of claim 11, wherein said magnesium oxide of said slag composition is maintained at a level of 1 – 5% of said total slag composition.

13. The process of claim 11, wherein said temperature is about 1475° – 1550° C.

14. The process of claim 11, wherein said pressure is about 50 – 200 millimeters of mercury.

15. The process of claim 11, wherein the melting in the reaction zone is conducted in the presence of an inert gas.

16. The process of claim 11, wherein the magnesium oxide is a calcined dolime of the formula $CaO \cdot X\,MgO$ where $0.5 \leq X \leq 2.0$.

* * * * *